United States Patent Office 3,736,275
Patented May 29, 1973

3,736,275

PROCESS FOR THE PRODUCTION OF PARTICLE BOARD USING CROSS-LINKED XANTHOMONAS COLLOID IN THE GLUE MIXTURE

Nicholas J. Iammarino, San Diego, Calif., assignor to Kelco Company, San Diego, Calif.

No Drawing. Filed Nov. 18, 1971, Ser. No. 200,196
Int. Cl. C08g *51/18*
U.S. Cl. 260—17.3 7 Claims

ABSTRACT OF THE DISCLOSURE

A process for producing particle board in which a Xanthomonas hydrophilic colloid and a cross-linking agent for said colloid are added to the glue mix. The glue mix is then sprayed onto wood chips which are compressed and heated to form the finished board. By use of the Xanthomonas colloid and the cross-linking agent, the amount of glue required for formation of the particle board is reduced.

This invention pertains to an improved procedure for forming particle board. Further, the invention pertains to a procedure for forming particle board which permits the use of a reduced amount of glue.

Various procedures are known to the prior art for forming particle board. In general, all of these procedures produce particle board by curing a mixture of a thermosetting resin in admixture with wood chips under pressure to produce a coherent structure in which the wood chips are bonded together by the resin. Prior art procedures for forming particle board may be further categorized in terms of caul processes and caul-less processes. The caul processes utilize a metal plate which is termed a caul. This plate is passed under a bin containing wood chips that have been wetted with a glue composed of a urea formaldehyde resin in water. There may also be present in the glue a catalyst to promote the curing of the urea formaldehyde resin.

In forming the particle board, a first layer of wood chips and resin is generally laid down on the caul plate. This first layer is termed the face mix and will form a face of the finished particle board. After the face mix is laid down on the caul, a second layer of wood chips and resin is then laid down on top of the face mix. This second layer is termed the core mix since it will form the core of the finished particle board. Following this, a third layer of wood chips and resin is laid down on top of the core mix. The third layer is also a face mix and will form the opposite face of the finished particle board. After the face mixes and core mix have been laid down on the caul plate by passing the plate under several bins which contain wood chips wetted by a urea formaldehyde resin in water, the several layers of wood chips and resin which have been deposited on the caul plate are termed a biscuit.

Following formation of the biscuit, a plurality of caul plates are loaded into a press. The presses employed in the caul process may be quite complex and receive a large number of individual caul plates. In operation of the press, the caul plates are generally individually loaded into a press from the top to the bottom of the press. The individual caul plates and biscuits are held apart in the press by separators and, when fully loaded, a press of this type may contain as many as 20 caul plates.

After loading of the press, the biscuits supported on the caul plates within the press may all be compressed at the same time. The spacer elements carried on each of the caul plates will determine the height of the individual particle boards after their formation by pressing of the biscuits. By way of example, a biscuit which has an initial thickness of about 3½ inches may be pressed down to a thickness of about 0.7 inch, or a biscuit which has an initial thickness of 7 inches may be pressed down to a final thickness of approximately 1⅞ inches. During the pressing operation, the biscuits are generally heated to a temperature such as 200–400° F. while being compressed at about 20 to 60 p.s.i. The exact conditions utilized in the pressing and curing of the biscuits to form the particle board may be varied depending upon a number of conditions, such as, the presence or absence of a curing catalyst, the nature of the curing catalyst, the type of urea formaldehyde resin system employed, the wood species used in forming the chips, the size of the chips, and the pressure and temperature limitations of the press.

After pressing of the biscuits at an elevated temperature, the press is then opened and the particle boards are removed from the caul plates. The caul plates are also removed from the press and allowed to cool, if necessary, and then re-used in the overall process by receiving wood chips and resin from bins to form biscuits, etc. After removal of the particle boards from the caul plate, they may be finished in a conventional manner before being shipped. The various conventional finishing operations can include, for example, cutting, sanding, coating, sizing, stacking, etc.

The caul-less process used for forming particle boards is quite similar to the caul process but with one important difference. Caul plates are not used in the caul-less process for supporting the biscuits. Rather, a mixture of wood chips and resin are deposited on a supporting surface, such as a perforated belt, to form the biscuits. The biscuits may then be moved onto press plates which support the biscuits during the pressing operation. After pressing and curing to form the particle boards, the boards may be subjected to standard finishing operations as enumerated above.

In any of the various procedures utilized by the prior art for forming particle board, it is necessary that the wood chips be sprayed with a glue composed of a thermosetting resin in water. The resin system which is almost universally employed in forming particle board utilizes a urea formaldehyde resin and optionally a curing catalyst. The glue-water mixture is sprayed onto the wood chips which are contained in a bin. In order to obtain a satisfactory distribution of the glue throughout the wood chips, it is necessary that the droplets of the glue-water mixture have a relatively small particle size. Typically, the size of the glue-water droplets may range in the order of about 1 mm. to about 20 mm.

A problem which has plagued prior art processes for forming particle board is the absorption of excess glue by the wood chips. This problem is particularly acute if the wood chips are derived from wood species that are porous. In attempting to solve this problem, one suggestion has been to size the wood chips with a thermoplastic resin to substantially reduce the porosity of the chips. Following this, the sized wood chips are admixed with a thermosetting resin and treated in a conventional manner to form particle board. This procedure is illustrated by U.S. Pat. 3,287,479 to Edward A. Naudain.

Other attempts by the prior art to control the problem of excess absorption of glue by the wood chips have involved the addition of various thickeners to the glue mix, such as guar gum, locust bean gum, carboxymethyl cellulose, hydroxyethyl cellulose, starch, or various combinations of thickeners. These attempts have resulted in failure since the addition of a thickener in any substantial amount to the glue mix produces an increase in the viscosity of the glue mixture. This, in turn, decreases the atomization efficiency of the glue mix as it is applied through the spray nozzles to the wood chips. As a result, the glue mix is not properly distributed throughout the wood chips and the wood chips are not uniformly bonded to each other to form the finished particle board.

In solving the problems of the prior art, as outlined above, I have found that the addition of a Xanthomonas hydrophilic colloid in conjunction with a cross-linking agent in an amount sufficient to produce only a very minor increase in the viscosity of the system produces a substantial reduction in the absorption of the glue by the wood particles. Since this result is achieved with only a minor increase in the viscosity of the glue mix, there is little change in the atomization efficiency of the glue mix. Thus, the glue mix may be readily applied through spray nozzles onto the wood particles to produce a relatively uniform distribution of glue throughout the particles.

The Xanthomonas hydrophilic colloids used in my invention are colloidal materials which are produced by bacteria of the genus Xanthomonas. Illustrative of such colloidal materials is the hydrophilic colloid produced by the bacterium *Xanthomonas campestris*. This colloidal material is a polymer containing mannose, glucose, potassium glucuronate and acetyl radicals. In such a colloid, the potassium portion of the colloid can be replaced by several other cations without any substantial change in the properties of the colloid for purposes of the present invention.

A Xanthomonas colloid is a high molecular weight, exocellular material which is prepared by a fermentation process utilizing a Xanthomonas bacteria, e.g., the bacterium *Xanthomonas campestris*. Typically, the fermentation medium may contain glucose, an organic nitrogen source, a phosphate buffer and appropriate trace elements. The incubation may be carried out under aerobic conditions with agitation for a sufficient time to produce the colloidal material.

After the fermentation is completed, the colloidal material may be recovered by precipitation from the fermentation mixture. Precipitation of the colloid is generally brought about by the addition of a lower alkanol, such as methanol. If desired, the fermentation beer may be subjected to filtration or centrifugation prior to the addition of the lower alkanol to cause precipitation of the colloid. The colloid, as prepared by the above procedure, will contain dead bacterial cells in admixture with the colloidal material.

Various Xanthomonas colloids may be prepared by substituting other known Xanthomonas organisms for the bacterium *Xanthomonas campestris* in the above described process. Examples of other Xanthomonas organisms are *Xanthomonas carotae, Xanthomonas incanae, Xanthomonas begoniae,* and *Xanthomonas malvacearum*.

Procedures for preparing a Xanthomonas hydrophilic colloid are described in a number of prior patents, and do not form a part of my invention. The description of the manner in which a Xanthomonas colloid is prepared is merely to provide a better understanding of the invention.

In accord with my process, a small quantity of a Xanthomonas hydrophilic colloid is added to the glue mix, which includes water, a urea formaldehyde resin, and optionally a curing catalyst for the urea formaldehyde resin. The quantity of Xanthomonas hydrophilic colloid may range from about 0.03 to about 2% by weight of the glue mix and is preferably in the order of about 0.1% by weight of the glue mix. The glue mix is generally contained in a vessel called the glue tank. If desired, the Xanthomonas hydrophilic colloid can be added directly to the glue tank. In most cases, however, this is not practical because the glue tank generally has a small capacity and contains about 300 lbs. of material. The production of particle board is a continuous process and, thus, materials are continuously added to and are continuously removed from the glue tank. For this reason, there is no advantage in having a large capacity glue tank.

A preferred procedure is to add the Xanthomonas hydrophilic colloid to a waterline leading into the glue tank. The volume of the waterline is generally larger than that of the glue tank in most installations and provides a better opportunity for the Xanthomonas hydrophilic colloid to go into solution.

There is also added, in accord with my process, a cross-linking agent for the Xanthomonas colloid. The cross-linking agent is a water-soluble salt which contains either ferrous or ferric ions. Ferrous or ferric ions or mixtures thereof react with the Xanthomonas hydrophilic colloid to form a cross-linked structure. Due to the shear in the system, the cross-linked structure is broken up as it is formed by reaction of ferric or ferrous ions with the Xanthomonas colloid. The net result is a disrupted gel system within the glue mix.

By introducing both the Xanthomonas colloid and the water soluble salt containing a ferrous or ferric ion into the waterline leading to the glue tank, better contact is obtained between the Xanthomonas colloid and the ferrous or ferric ion. When both the Xanthomonas colloid and cross-linking salt are introduced directly into the glue tank, the presence of other components within the glue tank, e.g., the urea formaldehyde resin and the curing catalyst for the resin, may interfere with the contact between the Xanthomonas colloid and the ferrous or ferric salt. When this occurs, a disrupted gel is not formed to the same degree as when the Xanthomonas colloid and the ferrous or ferric salt are added to a waterline leading to the glue tank.

The ferrous or ferric salt utilized in my process is added in an amount sufficient to provide an iron concentration ranging from about 7 parts per million to about 15% by weight based on the weight of the dry Xanthomonas hydrophilic colloid that is present. The ferrous ion reacts with the Xanthomonas hydrophilic colloid to give a relatively soft gel. In contrast, the ferric ion reacts with a Xanthomonas colloid to give a relatively hard gel.

The decision to use ferrous ions instead of ferric ions as a cross-linker or to use a mixture of the two will depend upon the equipment utilized in the particular plant for production of particle board. If the plant equipment produces a relatively low degree of shear, the use of a ferric salt could produce plugging problems when the glue mix is ejected through the spray nozzles onto the wood chips. In this case, plugging could be alleviated by using a cross-linking salt which provided only ferrous ions or by increasing the concentration of ferrous ions in the system while reducing that of the ferric ions. This would result in formation of a softer gel which would have less tendency to plug the ejection nozzles.

Conversely, if the degree of shear generated by the equipment is sufficiently high, it may destroy the softer gel formed by cross-linking of the ferrous ion with a Xanthomonas hydrophilic colloid. This would result in increased absorption of glue by the glue chips and would require increasing the amount of glue to produce satisfactory particle board. To alleviate this problem, a ferric salt could be substituted for the ferrous salt to produce a harder gel having a greater resistance to shear. Also, rather than to completely eliminate the ferrous salt, satisfactory results could be obtained in many cases merely by increasing the content of ferric ions with respect to the content of ferrous ions in the system.

In the previous caul processes for forming particle board, the weight of glue solids required was about six to seven percent by weight based on the weight of the wood chips. Higher glue levels were required in the caul-less process and ranged from about 12 to about 14% by weight of glue solids based on the weight of wood chips.

As a result of my invention, it is now possible to substantially reduce the level of glue solids required for the formation of particle board. Theoretically, if there were no loss of glue solids due to the capillary action of the wood chips in absorbing the glue, only about three to 3½% by weight of glue solids would be required based on the weight of the wood chips. My process does not completely eliminate the absorption of glue by the wood particles. Thus, I have been unable to produce satisfactory particle board by using the minimum glue solids concentrations predicted from theory. I have, however, been able to achieve substantial economies by reducing the glue solids levels to far less than their present levels.

To generalize, in the application of my invention to existing caul processes, I have been able to produce satisfactory particle board with glue solids level of about 4.5 to about 6.0 percent by weight based on the weight of the wood particles. In the application of my invention to existing caul-less processes, I have been able to prepare satisfactory particle board at glue solids levels of about 4.8 to about 6.5 percent by weight based on the weight of the wood particles.

In using my process, the increase in the viscosity of the glue-water mixture applied to the wood particles is relatively minor. By relatively minor, I refer to a viscosity increase in the order of about five to about ten centipoises. Thus, if the viscosity level of the glue mixture was already at 200 cps., the use of my process would result in an increased viscosity of the glue mixture to about 205 or 210 cps. As a result, the use of my process does not interfere to any appreciable extent with the atomization efficiency of the glue-water mixture as it is ejected through nozzles onto the wood particles. The use of my process, therefore, provides a uniform distribution of the glue solids throughout the wood particles as required for uniform bonding of the wood particles in producing particle board.

In the use of my process, a certain amount of trial and error may be involved in achieving the optimum conditions for a particular plant. To determine the optimum conditions, it can first be assumed that the plant is operating at the glue solids level previously employed to produce a particle board of a given strength. A small quantity of a Xanthomonas hydrophilic colloid and a water soluble ferrous or ferric salt may then be added to the glue mixture in the manner described previously. Following this, the strength of the resulting particle board may be measured. Since the addition of the Xanthomonas hydrophilic colloid and the cross-linking agent will increase the efficiency of the glue utilization in the process, the strength of the particle board will be greater than that of the particle board previously produced. At this point, the glue level utilized in the process may be gradually reduced while continuously monitoring the resulting strength of the particle board. In this manner, the optimum conditions, i.e., the exact concentration of Xanthomonas hydrophilic colloid and the exact concentration of the ferrous and/or ferric salt, are determined for production of satisfactory particle board at reduced glue solids levels.

My process, as described above, has particular application to the formation of particle board in which the binder is a urea-formaldehyde resin. However, my process may be used in the formation of particle board using as the binder material any thermosetting water soluble resin. In such use, the Xanthomonas hydrophilic colloid and cross-linking agent are present in the amounts specified above, i.e., about 0.03 to about 2% of the Xanthomonas colloid based on the weight of the glue mix and about 7 parts per million to about 15% by weight of a ferrous or ferric salt based on the dry weight of the Xanthomonas colloid.

My process may also be utilized in forming particle board in which an in situ resin system is used as the binder. Such resin systems are known and the particular makeup of the resin system is not critical to my process. Thus, for example, appropriate in situ resins include urea-formaldehyde-melamine, phenolic-melamine, urea-formaldehyde-phenolic, or urea-phenolic-melamine resin systems. In applying my process to the use of an in situ resin system, the resins and water may be mixed in a tank and then admixed with a Xanthomonas colloid and a ferrous or ferric salt, as described above. My process permits the use of in situ resin binders which have previously not been suitable for use in the formation of particle board. By the use of my process, the penetration of the wood particles by the resin may be controlled and the amount of glue required may thereby be reduced. Also, by the use of my process, the tackiness of in situ resins may be increased to provide better bonding of the wood particles in the preparation of particle board.

In the use of my process, as described above, a polymerization catalyst may be present to promote the polymerization of the resin binder. The acids given off by the wood particles in the formation of particle board my also act as a polymerization catalyst.

As described in the foregoing specification, my process has application to existing procedures, as described in the prior literature, for producing particle board. By utilizing my process, the glue solids levels required by prior processes may be reduced to achieve substantial economies in the production of particle board. The procedures presently utilized for formation of particle board do not have to be altered to any appreciable extent in the use of my process. Thus, my process can be applied to the manufacture of particle board without any extensive modification of existing plants and equipment.

What is claimed is:

1. A process for the production of particle board in which wood chips are treated with a glue-water mixture containing a urea-formaldehyde resin and thereafter formed into particle board by means of heat and pressure, the improvement comprising adding to the glue-water mixture from about 0.03 to about 2.0% by weight of the glue mixture of a Xanthomonas hydrophilic colloid and from about 7 parts per million to about 15% by weight based on the dry weight of said Xanthomonas colloid of a water soluble salt or mixture of salts containing ferrous ions, ferric ions, or mixtures thereof, to form a disrupted gel structure within said glue mixture and thereby to permit the reduction in the glue solids level in the production of particle board.

2. The process of claim 1 wherein said Xanthomonas hydrophilic colloid is a *Xanthomonas compestris* colloid.

3. The process of claim 1 wherein said Xanthomonas colloid and said water soluble salt are first admixed in water and then added to said glue-water mixture.

4. A process for the production of particle board in which wood chips are treated with a glue-water mixture containing a water soluble thermosetting resin and thereafter formed into particle board by means of heat and pressure, the improvement comprising adding to the glue-water mixture from about 0.03 to about 2.0% by weight of the glue mixture of a Xanthomonas hydrophilic colloid and about 7 parts per million to about 15% by weight based on the dry weight of said Xanthomonas colloid of a water soluble salt or mixture of salts containing ferrous ions, ferric ions, or mixtures thereof, to form a disrupted gel structure within said glue mixture and thereby to permit the reduction in the glue solids level in the production of particle board.

5. The process of claim 4 wherein said Xanthomonas hydrophilic colloid is a *Xanthomonas campestris* colloid.

6. The process of claim 4 wherein said resin is composed of an in situ polymerization resin system.

7. The process of claim 6 wherein said resin is a urea-formaldehyde-melamine resin.

References Cited

Chem. Abst., vol. 66: 4740Tr, "Aqueous Polymeric Coating Compositions," Tenneco Chemicals, Inc.

WILLIAM H. SHORT, Primary Examiner

E. WOODBERRY, Assistant Examiner

U.S. Cl. X.R.

264—122